United States Patent [19]

Van Ornum

[11] 4,068,027
[45] Jan. 10, 1978

[54] SEALANT APPLICATION METHOD

[75] Inventor: Joel V. Van Ornum, King County, Wash.

[73] Assignee: Rocket Research Corporation, Redmond, Wash.

[21] Appl. No.: 647,095

[22] Filed: Jan. 7, 1976

[51] Int. Cl.² .......................... C08J 3/24; C08K 5/08
[52] U.S. Cl. ................................ 428/35; 260/30.4 A;
 260/33.6 A; 260/33.8 UA; 260/42.36; 427/230;
 427/236; 428/521; 526/20; 526/52
[58] Field of Search ................ 260/42.36; 526/20, 52;
 427/230, 236; 428/35, 521

[56] References Cited

U.S. PATENT DOCUMENTS

| | | | |
|---|---|---|---|
| 2,551,600 | 5/1951 | Holland | 526/20 |
| 2,822,342 | 2/1958 | Ford et al. | 260/42.36 |
| 3,674,735 | 7/1972 | Callan | 260/42.36 |
| 3,846,370 | 11/1974 | Bunk et al. | 260/42.36 |

Primary Examiner—James H. Derrington
Attorney, Agent, or Firm—Dowrey & Cross

[57] ABSTRACT

A fast gelling method of formulating and applying a curable butyl rubber sealant composition which composition is cured using a quinoid curing agent and a free radical cross-linking activator. The curing agent and a first portion of the activator are added to the sealant components to produce a base component. If the amount of activator in the first portion is chosen correctly, the base component remains ungelled until the remainder of the activator is added, at which time a very rapid gel takes place. This method is particularly useful where the sealant is a tire sealant and is to be sprayed onto the inner surface of a tire.

39 Claims, 3 Drawing Figures

SEALANT APPLICATION METHOD

FIELD OF THE INVENTION

This invention involves a method of compounding and applying butyl rubber sealant compositions, such sealant compositions having applications as tire sealants, roofing sealants, seam sealants and other similar uses.

BACKGROUND OF THE INVENTION

A suitable self-healing tire puncture sealant must withstand wintertime temperatures to which tires are subjected when standing idle. Such a sealant must also withstand the high temperatures to which tires are heated under summertime driving conditions. These temperatures typically range from $-20°$ F to $270°$ F. A suitable tire sealant must be capable of sealing punctures when the puncturing object is retained in the tread and also when the puncturing object is removed. Thus, a tire sealant must be capable of adhering to the puncturing object as it works against a flexing tire during travel and must be capable of adhering to itself to seal the puncture after removal of the puncturing object. In addition, the sealant must remain effective for an extended period of time. These conditions require a combination of flexibility, tackiness and strength that are among the most demanding required of any sealant composition. Finally, a suitable tire sealant must be susceptible to economical formulation and application.

Because butyl rubber exhibits low air permeability and high resistance to aging, the prior art has attempted to utilize butyl rubber as a basic compound of sealants. Exemplary of such prior art are U.S. Pat. Nos. 2,756,801, 2,765,018 and 2,782,829. Methods of applying such sealants have included one in which the sealant is solvated, sprayed on to the inner surface of the tire, and allowed to cure in situ. In another method, it is cured in sheet form and then applied to the tire. Whatever the method, short gel times and cure times are important to the realization of production economies.

The gel time takes on a special importance in the spray application technique because the sprayed sealant, before gelling, tends to flow under its own weight. The result is that there is a maximum thickness of sealant, dependent on the gel time, which can be applied in one spraying operation. Despite the use of heat, thixotropes, centrifugal force and other techniques, this maximum thickness has previously been less than the thickness of sealant required for a self-healing tire. Multiple spraying/curing operations have therefore been necessary.

SUMMARY OF THE INVENTION

An effective sealant composition may be formulated using a carbon reinforced curable butyl rubber matrix and certain modifiers to achieve the necessary mechanical strength, thermal stability, and sealing capabilities required of a commercially acceptable self-healing tire puncture sealant. This sealant composition comprises a combination of partially cross-linked (i.e. partially cured) high and low molecular weight butyl rubbers, a tackifier, and a carbon reinforcer. The weight ratio of high molecular weight to low molecular weight butyl rubber may vary from 20/80 to 60/40. The tackifier constitutes about 55-70 wt.% of the composition and the carbon reinforcer constitutes up to about 17 wt.% of the composition, the balance being the cross-linked rubber constituents. To aid in maintaining sufficient tackiness and thermal stability at elevated temperatures, a thermoplastic and elastomeric partially-hydrogenated block copolymer may be included up to about 10 wt.% of the composition, the block copolymer having a general configuration of $A-(B-A)_{1-5}$ wherein prior to hydrogenation each A is a monovinyl arene polymer block and each B is a conjugated diene polymer block.

Such a sealant composition may be cured by means of a quinoid curing agent and a free radical cross-link activator. The present invention involves a method of formulating butyl rubber based sealant compositions using these curing materials. The method is based on the discovery that a dramatic reduction in the gel time can be achieved by adding the activator to the other components in two portions, rather than all at once. The first activator portion is added and after a short period of time, the product of this first reaction is an ungelled, uncured, base component which has an appreciable pot life and which gels almost immediately when mixed with the remainder of the activator. Larger first activator portions result in shorter gel times but also in shorter pot lives for the base components, this latter feature providing a practical upper limit to the size of the first portion. For spray applications, the base commponent and the second activator portion are mixed just prior to spraying. Using this method, an adequate thickness of the above sealant composition can be applied to a tire in a single spraying operation.

DETAILED DESCRIPTION OF THE INVENTION

Figure 1:
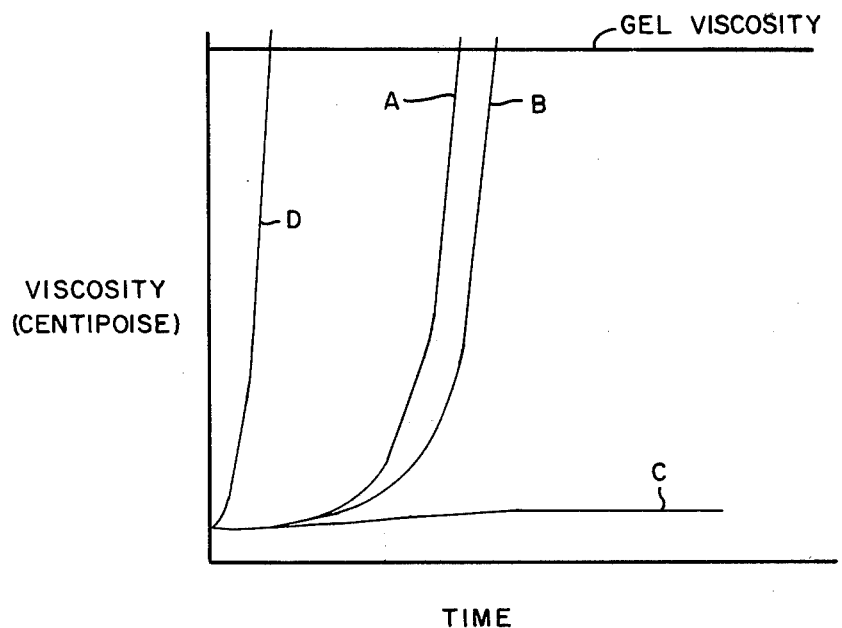
FIG. 1 is a graph showing schematically the viscosity vs. time behavior of a sealant composition with various amounts of activator added.

The copolymer matrix which provides the strength and continuity of the subject sealant compositions is herein termed "butyl rubber". Butyl rubber is intended to include copolymers of 96-99 Wt% isobutylene and 4-1 wt.% isoprene (Butyl IIR) as well as other rubbery copolymers of a major proportion (i.e., over 50% by weight) of an isoolefin having from 4 to 7 carbon atoms with a minor proportion by weight of an open chain conjugated diolefin having from 4 to 8 carbon atoms. The copolymer may consist of from 70 to 99.5% by weight of an isomonoolefin such as isobutylene or ethyl methyl ethylene copolymerized with from 0.5 to 30% by weight of an open chain conjugated diolefin such as isoprene; butadiene -1,3; piperylene; 2,3- dimethylbutadiene -1,3; 1,2-dimethyl-butadiene -1,3 (3-methyl pentadiene -1,3); 1,3 -dimethyl butadiene -1,3; 1-ethyl butadiene -1,3 (hexadiene -1,3); 1,4-dimethyl butadiene -1,3 (hexadiene -2,4); the copolymerization being effected by the usual manner of copolymerizing such monomeric materials.

A high molecular weight butyl rubber, as this term is used herein, refers to butyl rubber having an average molecular weight in excess of 100,000. While the use of butyl rubber having an average molecular weight in excess of 300,000-400,000 will not detract from the sealing qualities of the sealant, such butyl rubber is comparatively difficult to dissolve and combine with other constituents, as well as difficult to apply via an air spraying technique. Thus the preferred weight range for the high molecular weight butyl rubber is from 100,000 to about 300,000–4000,000. Low molecular weight butyl rubber, as the term is used herein, refers to butyl rubber having an average molecular weight, and therefore viscosity, substantially less than, on the order of about 1/10th, that of the high molecular weight butyl rubber. Because of the present commercial availability, the preferred molecular weight range for low molecular weight butyl rubber is from 10,000 to 30,000.

The tackifying agent serves two functions. First it decreases the elastic modulus of the sealant composition and thus increases its ability to self-heal over a puncture wound. Second, it increases the sealant composition's track, i.e., its ability to adhere to other objects. The several classes of tackifiers which are suitable for use in the sealant composition of this invention include low temperature tackifiers, which associate primarily with the elastomeric compounds, and high temperature tackifiers, which associate primarily with the more rigid components such as the end blocks of the block copolymers. Examples of classes of low temperature tackifiers are synthetic polyterpenes, thermoplastic olefins, pentaerythritol esters of hydrogenated rosins, and thermoplastic hydrocarbons. High temperature classes of tackifiers include triethylene glycol esters of hydrogenated rosins, vinyl toluene copolymers, alkyl aromatics and coumarone-indenes. Methyl esters of hydrogenated rosins, also suitable, are thought to associate with both phases. Preferred tackifiers are fluid monoolefin polymers of moderate viscosity, such as those consisting of essentially butylene (1-butene, 2-butene and isobutylene) with the balance being isoparaffins, having average molecular weights in the range of 500 to 5,000, terpene polymer resins such as polymerization products of B-pinene, and low molecular weight styrene polymer resins such as polymerization products of A-methylstyrene.

The reinforcing agent provides tensile strength to the sealant. It may be of any one or more of a large number of well known substances provided that one of these substances must be finely divided carbon. Carbon, such as carbon black, provides reaction sites for the curing process, and preferably comprises at least 1% of the solids by weight. The substance comprising the remainder of the reinforcing agent may either be carbon black or some other suitable substance selected on the basis of the desired color of the sealant. The reinforcing agent should be present in an amount not exceeding 17% of the solids by weight. Above this concentration, the sealant composition has an unsuitably high tensile strength. Examples of well known reinforcing agents for butyl rubbers include zinc oxide, aluminum hydrate, lithopone, whiting, clays, hydrated silicas, calcium silicates, silicoaluminates, magnesium oxide, and magnesium carbonate.

The block copolymer constituent, prior to hydrogenation, is composed of "A" blocks of monovinyl arene polymers including styrene, alpha methyl styrene, ring alkylated styrenes, and the like, as well as mixtures thereof, and "B" blocks of conjugated diene polymers having 4 to 10 carbon atoms per monomer molecule, including butadiene and isoprene. The A blocks make up the end groups and typically comprise about one third of the copolymer by weight, and the B blocks make up the mid groups and the balance of the copolymer. The copolymer is partially hydrogenated so that the conjugated diene block segments are substantially fully saturated. The monovinyl arene polymer block segments are not appreciably saturated. Hydrogenation in this fashion enhances the utility of the block copolymer as an oxidation and high temperature-degradation resistant constituent of the sealant composition. The average molecular weight of the copolymer is in the range of about 60,000 to 400,000. Block copolymers of this type are described in U.S. Pat. No. 3,595,942

Within the ratio of high molecular weight to low molecular weight butyl rubber of 20/80 to 60/40, the resultant sealant composition is capable of maintaining its adherence to a tire substrate while being stretched by a tread-penetrating object, such as a nail; is capable of adhering to the puncturing object, so as to form a seal about the object; and is capable of healing itself so as to re-seal a puncture wound after the puncturing object is removed. High-low molecular weight butyl rubber ratios outside of the above ratios do not provide sealant compositions capable of meeting these parameters over the required temperature ranges or capable of remaining elastic for sufficient periods of time, and hence, are unsatisfactory. Within these ratios of high-low molecular weight butyl rubbers, the resultant sealant composition modulus of elasticity is quite different.

Furthermore, a sealant composition having a ratio of high molecular weight to low molecular weight butyl rubber between about 35/65 to 45/55 has unexpectedly superior properties. Its initial modulus of elasticity, that is to say its modulus of elasticity during initial elongation, is quite low. This property enhances the puncture sealing capabilities of the sealant composition in that a puncturing object will disrupt the sealant composition to a lesser extent. Consequently, the sealant composition in the vicinity of a puncture responds more quickly to a break or tear in its continuity and the extent of puncturing damage is less.

While the ultimate tensile strength (i.e. the point of breakage during the elongation testing) and modulus of elasticity for sealant compositions having high to low molecular weight butyl rubber ratios components in the range of about 20/80 to 60/40 are generally the same, the manner in which the cured sealant compositions react during elongation and prior to reaching ultimate tensile strength is quite different within the range of about 35/65 to 45/55. Specifically, it has been discovered that while sealant compositions with a high to low molecular weight butyl rubber ratio of about 60/40 were relatively strong during low strain situations, i.e., a relatively high modulus of elasticity during initial elongation, a sealant composition with a high to low molecular weight butyl rubber ratio between about 35/65 to 45/55 is relatively weak in such situations and has a relatively low modulus of elasticity during its initial phases of elongation. Also, the latter's modulus of elasticity has an over-all increase during complete elongation of the cured composition to the point of ultimate tensile strength, while the former's modulus of elasticity has an over-all decrease during the complete elongation to the point of ultimate tensile strength. The importance of these particular factors is that the puncture sealing capability of a sealant has been found to be much more important during initial elongation and low strain situations rather than at the point of ultimate tensile stress or breakage. If the sealant is quite strong during the initial elongation, when an object punctures the tire and the sealant layer, the remainder of the sealant has a tendency to pull away from the puncture wound and therefore not seal the puncture. However, with the latter, which has a low strength during the initial elongation, the sealant stays in position when it is punctured and therefore seals the wound much easier. Thus, since the sealant must elongate during the low strain situations in order to adequately seal a puncture, sealant compositions having a high tensile strength during low strain situations, as in the former, may not seal the puncture as consistently. On the other hand, during high strain situations such as presented by a 40 to 50 psig internal tire pressure, it is not desirable to have the sealant flow if the tire is to remain inflated after a puncture has been sealed. This is accomplished by the latter composition since after initial sealant elongation, the modulus of elasticity and the tensile strength of this composition increase continuously to the point of ultimate tensile strength.

Because the sealant composition described herein has the unique ability to resist oxidation, and to remain stable and effective over a wide temperature range, it has numerous applications, such as a caulking compound and as a roofing sealant, in addition to its utility as a tire sealant. Because the environment to which a tire sealant is subjected is the most severe, the examples below relate the sealant composition to this environment for purposes of illustration. It will be understood that the ratio of the essential ingredients may be varied within the ranges set forth above and that other compounding materials may be replaced by and/or supplemented with such other materials as may be appropriate to deal with the environment contemplated.

Within the scope of the present invention, curing materials for the above described compositions include quinoid curing agents used in conjunction with free radical cross-link activators. Quinoid cures depend upon cross linking through the nitroso groups of aromatic dinitroso compounds. Of the available quinoid curing agents, p-quinone dioxime produces the most rapid cures and is thus preferred for use in conjunction with the present invention. Other suitable quinoid curing agents include dibenzoyl-p-quinone dioxime, p-dinitrosobenzene and N-Methyl-N, 4-dinitrosoaniline, the latter two being available on a clay base as "Polyac" from E. I. DuPont de Nemours & Co. and as "Elastopar" from Monsanto Chemical Co., respectively. The curing reaction using p-quinone dioxime is thought to involve an intermediate, p-dinitroso benzene, as the actual cross linking molecule.

The cross linking activators which may be used while practicing the present invention include those activators which can produce free radicals of sufficient reactivity to initiate a free radical curing reaction between the curing agent and the butyl rubber. Such reactivity may be determined by combining the activator with the other sealant components and monitoring the viscosity of the mixture.

Suitable free radical activators include the diaroyl and diacyl peroxides. Specific examples are benzoyl peroxide, 2,4-dichlorobenzoyl peroxide, dibenzoyl peroxide, bis (p-monomethoxy-benzoyl) peroxide, p-monomethoxybenzoyl peroxide and bis (p-nitrobenzoyl) peroxide. Benzoyl peroxide is preferred because it is comparatively safe to handle, readily available, and inexpensive.

In the above described sealant compositions, the preferred concentration of p-quinone diozime is 2–4% by weight of butyl rubber. The preferred concentration of benzoyl peroxide is 7–10% by weight of butyl rubber.

The formulation of a cured butyl rubber sealant composition is conveniently carried out through the use of solvents which facilitate mixing and handling of the various components. Typical solvents which can be used include toluene, hexane, heptane, cyclohexane, cyclohexanone, naptha, trichloroethylene and tetrahydrofuran, either singly or in combination. The sealant components are dissolved or dispersed in the solvent, and the solvated components are then sprayed, extruded or otherwise disposed onto a surface, whereupon the solvent evaporates and the sealant cures.

The basis of the present invention can be understood by reference to the graph of FIG. 1. For this graph it is assumed that all of the ingredients of a butyl rubber based sealant, including the quinoid curing agent but not including the free radical activator, have been solvated and combined. Curve A repreents the result of then adding all of the activator at time = 0. The viscosity of the solvated mixture remains low and substantially constant for a period of time, and then the viscosity rises rapidly and the mixture gels. The time for which the viscosity remains low, after all of the activator has been added, is hereafter referred to as the "delay time". Curve B represents the result of witholding a comparatively small amount of activator from the mixture. The gel time increases slightly but the curve is otherwise quite similar to curve A. However, as the amount of withheld activator is increased, a point is rather suddenly reached at which the mixture remains ungelled for substantially longer periods of time, as represented by curve C. Eventually the viscosity of this mixture does slowly increase to gel viscosity (not shown). The period of time for which this mixture remains sprayable is referred to as its pot life.

If a mixture of components has been prepared using a small enough portion of the activator so that the results are as shown in curve C, and then, after a period of time greater than the delay time but less than the pot life, the remainder of the activator is added, the result is as shown in curve D. In this curve, time = 0 is taken as the time when the remainder of the activator is added. As can be seen, the mixture gels very rapidly. Thus by splitting the activator into two portions and adding these separately to the other components, it is possible to control the timing of the sudden viscosity increase. In spray applications, the second activator portion is added just prior to spraying, so that this sudden viscosity increase occurs while the sealant is being deposited on the tire, or shortly thereafter. By this means a satisfactory thickness of butyl rubber sealant can be deposited on a tire in a single spraying operation.

Figure 2:
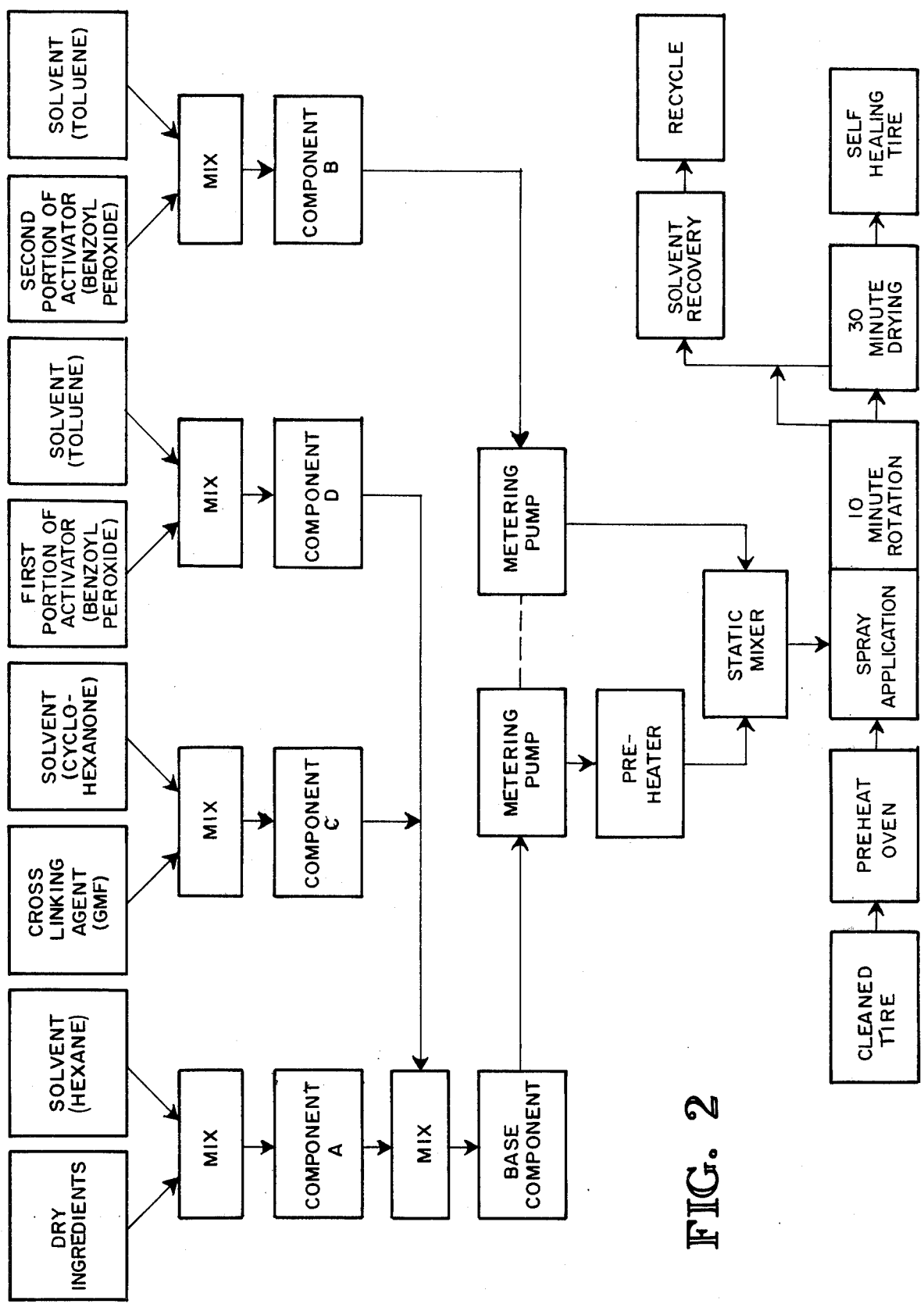
FIG. 2 is a flow chart showing the operations involved in formulating and applying a sealant composition using a three solvent system.
Figure 3:
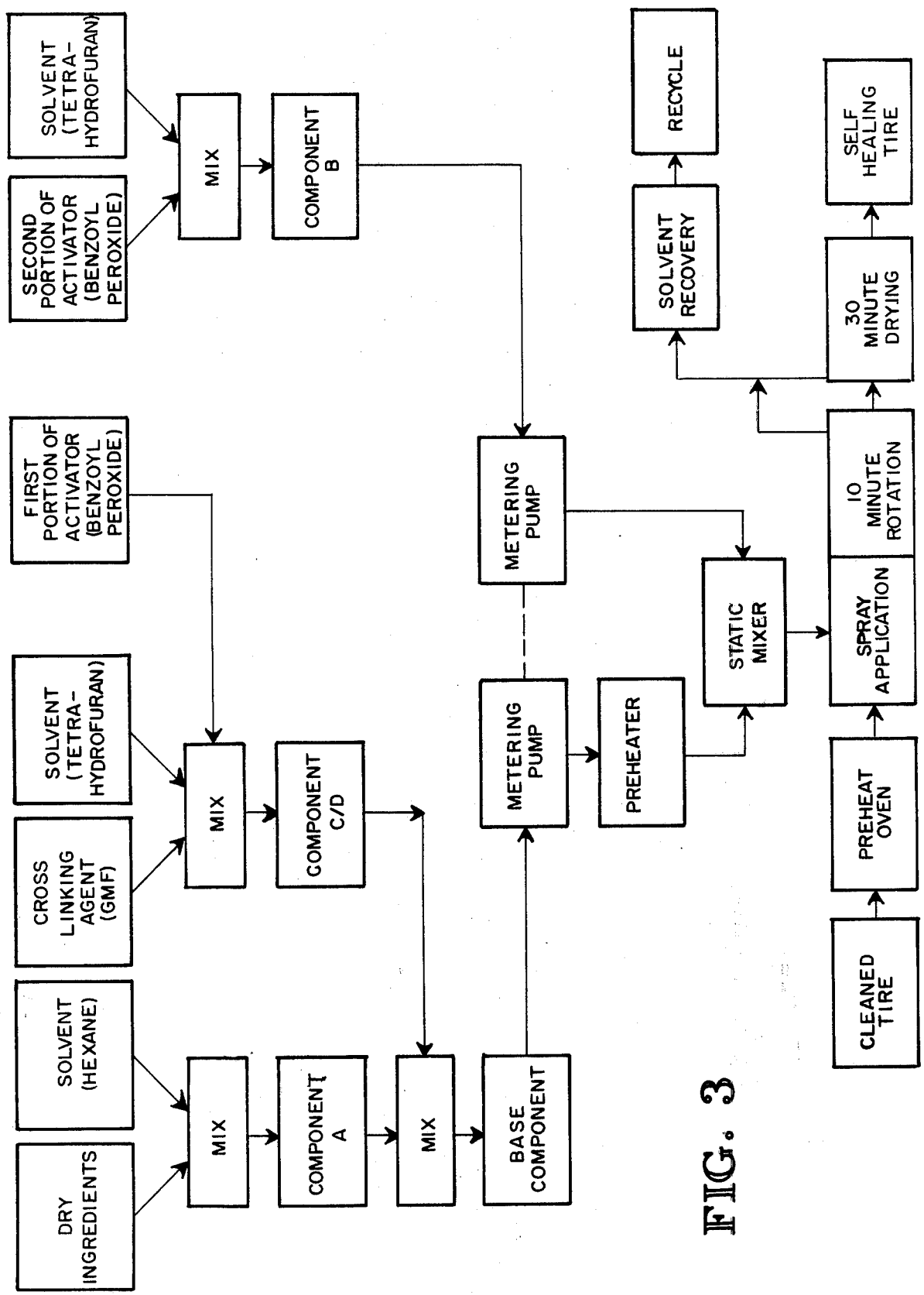
FIG. 3 is a flow chart showing the operations involved in formulating and applying a sealant composition using a two solvent system.

The practice of the present invention may be carried out in the manner outlined by the flow charts of FIGS. 2 and 3. Both flow charts illustrate a method of formulating and applying a butyl rubber tire sealant of the type described above. FIG. 2 shows a three solvent system. The dry ingredients (butyl rubbers, tackifier, block copolymer and reinforcing agent) are dissolved in hexane to form component A. The pot life of this component is greater than one year. The p-quinone dioxime ("G-M-F") cross linking agent is dissolved in cyclohexanone to form component C, with a pot life of greater than one year. First and second portions of the benzoyl peroxide activator are dissolved in toluene to form components D and B, each having a pot life of from 20-60 days. Components A, C and D are then combined to form the base component. Depending upon the amount of activator in the first portion (component D), as explained below, the pot life of the base component may vary from 2 hours to 20 days. The base component and component B are then mixed and applied to the tire as indicated.

The exact method of forming the base component is not critical to the practice of the present invention, and may be determined based on such factors as number and amounts of solvents to be used, and the ease of handling the various components. A two solvent system is illustrated in FIG. 3 in a manner similar to FIG. 2. It is important, however, that the base component contain the butyl rubbers, the curing agent, the finely divided carbon and the first portion of activator. As explained below, it is possible to include some or all of the tackifier or block copolymer in component B.

The chemical basis of the present invention, not yet fully determined, is thought to be that quinoid cures are two step reactions, both steps requiring activator to proceed. In step one, the curing agent is converted to an aromatic dinitroso compound; in step two, the dinitroso compound reacts with the butyl rubber, forming crosslinks. It is further though that the curing agent possesses a free radical scavenging ability which inhibits the step two reaction. Thus actual crosslinking cannot begin until essentially all of the curing agent has been converted to the dinitroso intermediate. Further, commercial butyl rubber usually contains free radical scavengers, such as antioxidant and antiozonant inhibitors, which must also be converted to other compounds before step two can proceed. It is the function of the first activator portion to carry out part or all of these preliminary reactions so that when the second activator portion is added, the actual crosslinking can quickly proceed. The delay time is the time required for these preliminary reactions to occur when all of the activator is added at once.

Any substantial amount of activator in the first portion will drive some of the preliminary reaction and thus lay the groundwork for a faster reaction and a shorter gel time when the second portion is added. As the amount of activator in the first portion is raised, both the pot life of the base component and the gel time decrease. The upper limit to the amount of activator in the first portion is reached either when the pot life becomes too short for the particular processing system being used, or when the pot life approaches the delay time for the curing system. This latter point is reached when the activator in the first portion is sufficient to convert essentially all of the curing agent and inhibitors present to non-scavenging forms.

From the above it is clear that the base component must contain the curing agent, the first portion of activator and, insofar as they contain inhibitors, the butyl rubbers. The base component must also contain the finely divided carbon, both because it is required for the preliminary reactions and because it would decompose the activator if placed in component B. Further, it has been found that the tackifiers and the block copolymers often contain small amounts of substances which seem to be inhibitors, and the inclusion of these substances in the base component is therefore preferred. More generally, it is preferred that the base component include all substances other than the second portion of activator.

The above described sealant compositions are preferably cured using p-quinone dioxime as the curing agent and benzoyl peroxide as the activator. At p-quinone dioxime concentration by weight of 2.5 parts per 100 parts of rubber (hereafter abbreviated phr, rubber referring to all butyl rubbers present), the preferred amount of activator in the first portion is between 2.5 phr and 4.0 phr. These amounts correspond to pot lives of 20 days and 2 hours respectively. Below 2.5 phr the gel time is unnecessarily slow, since a 20-day pot life is ample for most applications. Above 4 phr the pot life is too short for many processing environments. The delay time at a 2.5 phr p-quinone dioxime level is approximately 30 minutes.

As the concentration of p-quinone dioxime changes by small amounts from 2.5 phr, the preferred amount of benzoyl peroxide in the first activator portion changes, in the same direction, by approximately twice the amount of the p-quinone dioxime change. Thus, if the concentration of p-quinone dioxime is 3.0 phr, then the present amount of benzoyl peroxide in the first activator portion is between approximately 3.5 phr and 5.0 phr. Similarly at 2.0 phr of p-quinone dioxime, the preferred range is approximately 1.5 phr to 3.0 phr. For a given p-quinone dioxime level, these approximations can be made more definite by simply varying the amount of the first activator portion and measuring the resulting pot lives. The delay time at a given p-quinone dioxime level may also be routinely determined by adding all of the activator and monitoring the viscosity. Such measurements may also be used to determine desirable levels for the first activator portion and delay times for combinations of curing materials other than p-quinone dioxime and benzoyl peroxide.

The sealant compositions utilized in the following examples were prepared by admixing the ingredients described below in the proportions indicated by Table I. All proportions are given by weight.

TABLE 1

| Ingredient | Selant Compositions by Weight | | |
|---|---|---|---|
| | A | B | C |
| High Molecular Weight Butyl Rubber[1] | 9.6 | 14.5 | 9.5 |
| Low Molecular Weight Butyl Rubber[2] | 14.4 | 9.5 | 14.5 |
| Tackifier[3] | 62.2 | 61.75 | 61.75 |
| Carbon Black[4] | 9.1 | 9.5 | 9.5 |
| Block Copolymer[5] | 4.8 | 4.75 | 4.75 |
| Curing agent[6] | 2.5 | 2.5 | 2.5 |
| Activator[7] | 7.0 | 7.9 | 7.9 |

[1]A copolymer was used consisting of 98.5% isobutylene and 1.5% isoprene by weight having average molecular weight between 100,000 and 300,000 available from Exxon Oil Company under Trademark "Butyl 365".
[2]A copolymer was used consisting of 96% isobutylene and 4% isoprene by weight having average molecular weight between 10,000 and 30,000 available from Exxon Oil Company under Trademark "Butyl LM-430".
[3]A polymer was used consisting of 98% isobutylene and 2% isoparaffins, having average molecular weight between 500 and 5,000 available from American Oil Company under Trademark "Indopol H-300".
[4]A furnace black was used having a surface area of 235 square meters/gram, arithmetic mean particle diameter of 17 millimicrons, and pH of 9.0 available from Cities Service Oil Company, under Trademark "Raven-2000".
[5]A block copolymer was used having a configuration A-(B-A)$_{1-5}$, A representing a polystyrene block and B representing a hydrogenated polyisoprene block, the isoprene making up about two thirds of the compound by weight and the average molecular weight being between 70,000 and 150,000. The compound is available from Shell Oil Company under Trademark "Kraton G-1650".
[6]P-quinone dioxime was used. Figure given is parts per 100 parts butyl rubber (phr).
[7]Benzoyl peroxide was used. Figure given is parts per 100 parts of butyl rubber (phr).

EXAMPLE I

A number of sealant compositions were prepared according to formula "A" above. The base component was prepared by dissolving or dispersing in toluene the butyl rubbers, the tackifier, the carbon black, the block copolymer, the curing agent, and 3.0 phr activator, using equal parts by weight of solvent and solids. The pot life of this component was between 5 and 7 days. The second portion (remainder) of the activator was then separately dissolved in toluene. The solvated base component was allowed to stand for 2 hours, after which the solvated second activator portion was added, resulting in a final composition consisting of 45% by weight solids. This final composition was allowed to stand and its gel time, measured from the time that the second activator portion was added, was determined using a Brookfield Viscometer, model RVF, spindle No. 4 at 20 rpm. 10,000 centipoise was taken as gel viscosity. All operations were carried out at room temperature. Gel times of between 4 and 6 minutes were measured.

EXAMPLE II

A number of sealant compositions according to formula "A" were prepared as in Example I, except that the final composition was comprises of 50% solids by weight, and the base component was heated to 120° F just before being mixed with the second activator portion to form the final composition. Without delay the final composition was then sprayed onto the inner surface of a preheated automobile tire using a Graco Hydra-Cat Model 985-901 as a metering/pumping apparatus. The tires were cleaned prior to application to remove mold release materials from the inner tire surface. About one minute of spraying was required to coat each tire with a sealant layer of 0.15 to 0.20 inch thickness. The tires were rotated during application. Gel time, determined visually, ranged between 2 and 4 minutes. These gel times were shorter than the gel times of example I because of the higher temperature and because considerable solvent is lost during the spraying operation. A 0.15 inch thickness of sealant compositions A, B, or C is sufficient to form the desired self healing sealant layer.

EXAMPLE III

A number of sealant compositions according to formula "A" were prepared using a three solvent system as shown in FIG. 2. The butyl rubbers, the tackifier, the carbon black and the block copolymers were dissolved or dispersed in hexane, the curing agent was dissolved in cyclohexanone, and 3.0 phr activator was dissolved in toluene. These were mixed to form the base component. The remainder of the activator was dissolved in toluene to form component B. The base component and component B were mixed to form the final composition, which consisted of 50% solids by weight, with the solvent consisting of 80% hexane, 15% toluene and 5% cyclohexanone by weight. Before mixing with component B, the base component was preheated to 120° F. The compositions were sprayed as in example II. Gel times slightly less than those of example II were obtained due to increased solvation of curing agent in cyclohexanone.

EXAMPLE IV

Example III was repeated using a hexane-tetrahydrofuran two solvent system as shown in FIG. 3. The solvents in the final composition consisted of 80% hexane and 20% tetrahydrofuran. Gel times were similar to those of example III.

EXAMPLE V

Examples III and IV were repeated, except that the bae component was not preheated, the final composition consisted of 45% solids, and the final composition was allowed to stand rather than being sprayed. The viscosity of the final composition was measured as in example I. Gel times similar to those of example I were obtained.

EXAMPLE VI

A sealant composition according to formula "B" was prepared using the method of example I, except that the first portion of activator consisted of 4.0 phr. The gel time was 1 minute.

EXAMPLE VII

Sealant compositions according to formulas "A" and "B" were prepared, using the method of example I, except that all the activator was added at once. The gel times were 30 to 33 minutes for composition "A" and 27-30 minutes for cmposition "B".

EXAMPLE VIII

Example II was repeated except that the first portion of activator used to form the base component was changed to 2.5 phr and 3.5 phr. At 2.5 phr the pot life of the base component was 20 days and the gel time of the sprayed sealant was between 8 and 10 minutes. At 3.5 phr, the pot life was 24 hours and the gel time was between 2 and 4 minutes.

EXAMPLE IX

A base component according to formula "A" was prepared as in Example I, using 3.0 phr activator. The viscosity of this base component was monitored until gelling occurred. The concentration of curing agent was then changed from 2.5 phr to 3.0 phr, and it was determined that 4.0 phr activator was now required to produce a viscosity vs. time characteristics similar to 3.0 phr activator with 2.5 phr curing agent. Similarly, it was determined that curing agent/activator concentrations of 2.5 phr/2.5 phr and 3.0 phr/3.5 phr was nearly identical in their viscosity vs. time behaviors.

EXAMPLE X

A sealant composition according to formula "C" was prepared using the method of example I, except that 4.0 phr activator and only one-half of the tackifier were added to the base component. The pot life of this base component was determined to be about 2 hours. When the remainder of the activator and tackifier were added after about 1-½ hours, the gel time was 2-½ minutes.

It will be understood that the invention may be embodied in other specific forms without departing from the spirit or central characteristics thereof. The present examples and embodiments, therefore, are to be considered in all respect as illustrative and not restrictive, and the invention is not to be limited to the details given herein but may be modified within the scope of the appended claims.

What is claimed is:

1. A method of compounding a sealant composition, which sealant composition comprises the reaction product, in the presence of finely divided carbon, of (a) a copolymer comprising a major proportion of an isoolefin having 4 to 7 carbon atoms with a minor proportion of an open chain conjugated diolefin having 4 to 8 carbon atoms, (b) a quinoid curing agent, and (c) a free radical cross-linking activator, capable of initiating a cross-linking reaction between the copolymer and the curing agent, in an amount sufficient to at least partially cross-link the copolymer, said method comprising the steps of:
- providing an essentially uncross-linked base component comprising the copolymer, the curing agent, the carbon and a portion of the activator;
- providing a second component comprising the remainder of the activator; and
- mixing the base component and the second component.

2. The method of claim 1, wherein the copolymer is comprises by weight of beteen 96% to 99% isobutylene and between 4% and 1% isoprene.

3. The method of claim 1, wherein the curing agent is p-quinone dioxime.

4. The method of claim 1, wherein the activator is selected from the group consisting of diacyl and diaroyl peroxides.

5. The method of claim 1, wherein the activator is benzoyl peroxide.

6. The method of claim 2, wherein the curing agent is p-quinone dioxime and the activator is benzoyl peroxide.

7. A method of compounding a sealant composition, which sealant composition comprises the reaction product, in the presence of finely divided carbon, of (a) a copolymer comprising a major proportion of an isolefin having 4 to 7 carbon atoms with a minor proportion of an open chain conjugated diolefin having 4 to 8 carbon atoms, (b) a quinoid curing agent, and (c) a free radical cross-linking activator capable of initiating a cross-linking reaction between the copolymer and the curing agent, in an amount sufficient to at least partially cross-link the copolymer, said copolymer, curing agent, and activator being characterized by a delay time, defined as the time elapsing between mixing of copolymer, carbon, curing agent and all of the activator and the rapid rise in viscosity of the mixed components, said method comprising the steps of:
- forming a base component by mixing the copolymer, the curing agent, the carbon, and a first portion of the activator, which activator portion is less than the amount of activator which will cause the viscosity of the base component to rise rapidly within a period of time substantially equal to the delay time;
- allowing the base component to stand for a period of time greater than the delay time but less than the pot life of the base component; and
- adding the remainder of the activator to the base component.

8. The method of claim 7, wherein the copolymer is comprised by weight of between 96% to 99% isobutylene and between 4% and 1% isoprene.

9. The method of claim 7, wherein the curing agent is p-quinone dioxime.

10. The method of claim 7, wherein the activator is selected from the group consisting of diacyl and diaroyl peroxides.

11. The method of claim 7, wherein the activator is benzoyl peroxide.

12. The method of claim 8, wherein the curing agent is p-quinone dioxime and the activator is benzoyl peroxide.

13. The method of claim 12, wherein the p-quinone dioxime is present in an amount between 2.0% and 3.0% by weight of copolymer, the benzoyl peroxide is present in a total amount between 7% and 10% by weight of copolymer, and the amount of benzoyl peroxide in the first portion of activator, in parts by weight per 100 parts of copolymer, is between twice the amount of p-quinone dioxime minus 3 and twice the amount of p-quinone dioxime minus 1.

14. In a method of applying a sealant composition to an object, which sealant composition comprises the reaction product, in the presence of finely divided carbon, of (a) a copolymer comprising a major proportion of an isoolefin having 4 to 7 carbon atoms with a minor proportion of an open chain conjugated diolefin having 4 to 8 carbon atoms, (b) a quinoid curing agent, and (c) a free radical cross-linking activator, capable of initiating a cross-linking reaction between the copolymer and the curing agent, in an amount sufficient to at least partially cross-link the copolymer, the improvement comprising the steps of:
- providing an essentially uncross-linked base component comprising the copolymer, the curing agent, the carbon and a portion of the activator;
- providing a second component comprising the remainder of the activator;
- mixing the base component and the second component; and
- applying the mixture of base component and second component to the object.

15. The method of claim 14, wherein the copolymer is comprised by weight of between 96% to 99% isobutylene and between 4% and 1% isoprene, the curing agent is p-quinone dioxime and the activator is benzoyl peroxide.

16. The method of claim 14, wherein the sealant composition is applied to the object and cured in situ.

17. The method of claim 16, whrein the copolymer is comprised by weight of between 96% to 99% isobutylene and between 4% and 1% isoprene, the curing agent is p-quinone dioxime and the activator is benzoyl peroxide.

18. The method of claim 14, wherein the sealant composition is cured before being applied to the object.

19. The method of claim 18, wherein the copolymer is comprised by weight of between 96% to 99% isobutylene and between 4% and 1% isoprene, the curing agent is p-quinone dioxime and the activator is benzoyl peroxide.

20. In a method of applying a sealant composition to an object, which sealant composition comprises the reaction product, in the presence of finely divided carbon, of (a) a copolymer comprising a major proportion of an isolefin having 4 to 7 carbon atoms with a minor proportion of an open chain conjugated diolefin having 4 to 8 carbon atoms, (b) a quinoid curing agent, and (c) a free radical cross-linking activator capable of initiating a cross-linking reaction between the copolymer and the curing agent, in an amount sufficient to at least partially cross-link the copolymer, said copolymer, curing agent, and activator being characterized by a delay time, defined as the time elapsing between mixing of copolymer, carbon, curing agent and all of the the activator and the rapid rise in viscosity of the mixed components, the improvement comprising the steps of:
- forming a base component by mixing the copolymer, the curing agent, the carbon, and a first portion of the activator, which activator portion is less than the amount of activator which will cause the viscosity of the base component to rise rapidly within a period of time substantially equal to the delay time;

allowing the base component to stand for aperiod of time greater than the delay time but less than the pot life of the base component;

adding the remainder of the activator to the base component; and applying the combination of base component and remainder of the activator to the object.

21. The method of claim 20, wherein the copolymer is comprised by weight of between 96% to 99% isobutylene and between 4% and 1% isoprene, the curing agent is p-quinone dioxime and the activator is benzoyl peroxide.

22. The method of claim 20, wherein the sealant composition is applied to the object and cured in situ.

23. The method of claim 22, where the copolymer is comprised by weight of between 96% and 99% isobutylene and between 4% and 1% isoprene, the curing agent is p-quinone dioxime and the activator is benzoyl peroxide.

24. The method of claim 20, where the sealant composition is cured before being applied to the object.

25. The method of claim 24, wherein the copolymer is comprised by weight of between 96% and 99% isobutylene and between 4% and 1% isoprene, the curing agent is p-quinone dioxime and the activator is benzoyl peroxide.

26. In a method of making a self healing tire, which method involves applying to the inner surface of the tire a sealant composition comprising the reaction product, in the presence of finely divided carbon, of (a) a copolymer comprising a major proportion of an isoolefin having 4 to 7 carbon atoms with a minor proportion of an open chain conjugated diolefin having 4 to 8 carbon atoms, (b) a quinoid curing agent, and (c) a free radical cross-linking activator, capable of initiating a cross-linking reaction between the copolymer and the curing agent, in an amount sufficient to at least partially cross-link the copolymer, the improvement comprising the steps of:

providing an essentially uncross-linked base component comprising the copolymer, the curing agent, the carbon and a portion of the activator;

providing a second component comprising the remainder of the activator;

mixing the base component and the second component; and applying the mixture of base component and second component to the inner surface of the tire.

27. The method of claim 26, wherein the copolymer is comprised by weight of between 96% to 99% isobutylene and between 4% and 1% isoprene, the curing agent is p-quinone dioxime and the activator is benzoyl peroxide.

28. The method of claim 26, wherein the sealant composition is applied to the inner surface of the tire and cured in situ.

29. The method of claim 28, wherein the copolymer is comprised by weight of between 96% to 99% isobutylene and between 4% and 1% isoprene, the curing agent is p-quinone dioxime and the activator is benzoyl peroxide.

30. The method of claim 26, wherein the sealant composition is cured before being applied to the inner surface of the tire.

31. The method of claim 30, wherein the copolymer is comprised by weight of between 96% to 99% isobutylene and between 4% and 1% isoprene, the curing agent is p-quinone dioxime and the activator is benzoyl peroxide.

32. In a method of making a self healing tire, which method involves applying to the inner surface of the tire a sealant composition comprising the reaction product, in the presence of finely divided carbon, of (a) a copolymer comprising a major proportion of an isoolefin having 4 to 7 carbon atoms with a minor proportion of an open chain conjugated diolefin having 4 to 8 carbon atoms, (b) a quinoid curing agent, and (c) a free radical cross-linking activator capable of initiating a cross-linking reaction between the copolymer and the curing agent, in an amount sufficient to at least partially cross-link the copolymer, said copolymer, curing agent, and activator being characterized by a delay time, defined as the time elapsing between mixing of copolymer, carbon, curing agent and all of the activator and the rapid rise in viscosity of the mixed components, the improvement comprising the steps of:

forming a base component by mixing the copolymer, the curing agent, the carbon, and a first portion of the activator, which activator portion is less than the amount of activator which will cause the viscosity of the base component to rise rapidly within a period of time substantially equal to the delay time;

allowing the base component to stand for a period of time greater than the delay time but less than the pot life of the base component;

adding the remainder of the activator to the base component; and applying the combination of base component and remainder of the activator to the inner surface of the tire.

33. The method of claim 32, wherein the copolymer is comprised by weight of between 96% to 99% isobutylene and between 4% and 1% isoprene, the curing agent is p-quinone dioxime and the activator is benzoyl peroxide.

34. The method of claim 32, wherein the sealant composition is applied to the inner surface of the tire and cured in situ.

35. The method of claim 34, wherein the copolymer is comprised by weight of between 96% to 99% isobutylene and between 4% and 1% isoprene, the curing agent is p-quinone dioxime and the activator is benzoyl peroxide.

36. The method of claim 32, wherein the sealant composition is cured before being applied to the inner surface of the tire.

37. The method of claim 36, wherein the copolymer is comprised by weight of between 96% to 99% isobutylene and between 4% and 1% isoprene, the curing agent is p-quinone dioxime and the activator is benzoyl peroxide.

38. The method of claim 35, wherein the p-quinone dioxime is present in an amount between 2.0% and 3.0% by weight of copolymer, the benzoyl peroxide is present in a total amount between 7% and 10% by weight of copolymer, and the amount of benzoyl peroxide in the first portion of activator, in parts by weight per 100 parts of copolymer is between twice the amount of p-quinone minus 3 and twice the amount of p-quinone dioxime minus 1.

39. The method of claim 37, wherein the p-quinone dioxime is present in an amount between 2.0% and 3.0% by weight of copolymer, the benzoyl peroxide is present in a total amount between 7% and 10% by weight of copolymer, and the amount of benzoyl peroxide in the first portion of activator, in parts by weight per 100 parts of copolymer is between twice the amount of p-quinone dioxime minus 3 and twice the amount of p-quinone dioxime minus 1.

* * * * *

UNITED STATES PATENT AND TRADEMARK OFFICE
CERTIFICATE OF CORRECTION

PATENT NO. : 4,068,027
DATED : January 10, 1978
INVENTOR(S) : Joel V. Van Ornum

It is certified that error appears in the above-identified patent and that said Letters Patent are hereby corrected as shown below:

Column 3, line 16, change "track" to --tack--.

Column 6, line 17, change "repreents" to --represents--.

Column 9, line 21, change "comprises" to --comprised--.

Column 10, line 4, change "bae" to --base--.

Claim 2, line 2, change "comprises" to --comprised--.

Claim 20, line 20, change "the" first occurrence, to --that--; line 24, change "aperiod" to --a period--.

Signed and Sealed this

Twenty-seventh Day of February 1979

[SEAL]

Attest:

RUTH C. MASON
Attesting Officer

DONALD W. BANNER
Commissioner of Patents and Trademarks